(12) United States Patent
Jones, IV et al.

(10) Patent No.: US 9,462,596 B2
(45) Date of Patent: Oct. 4, 2016

(54) CHANNEL SELECTION RULES FOR SUB-1-GHZ BASIC SERVICE SETS

(71) Applicant: QUALCOMM Incorporated, San Diego, CA (US)

(72) Inventors: Vincent Knowles Jones, IV, Redwood City, CA (US); Sameer Vermani, San Diego, CA (US); Simone Merlin, Solana Beach, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/468,994

(22) Filed: Aug. 26, 2014

(65) Prior Publication Data

US 2015/0003378 A1    Jan. 1, 2015

Related U.S. Application Data

(62) Division of application No. 13/664,029, filed on Oct. 30, 2012.

(60) Provisional application No. 61/553,806, filed on Oct. 31, 2011.

(51) Int. Cl.
| | |
|---|---|
| H04W 4/00 | (2009.01) |
| H04W 72/08 | (2009.01) |
| H04W 16/14 | (2009.01) |
| H04W 48/16 | (2009.01) |

(Continued)

(52) U.S. Cl.
CPC ......... *H04W 72/082* (2013.01); *H04W 16/14* (2013.01); *H04W 48/16* (2013.01); *H04W 84/12* (2013.01); *H04W 84/18* (2013.01)

(58) Field of Classification Search
None
See application file for complete search history.

(56) References Cited

U.S. PATENT DOCUMENTS 7,835,339 B1 * 11/2010 Benveniste ............... 370/344
8,155,482 B2    4/2012 Chan et al.
(Continued)

FOREIGN PATENT DOCUMENTS

| JP | 2011015048 A | 1/2011 |
|---|---|---|
| JP | 2013053411 A | 3/2013 |
| WO | 2012006365 | 1/2012 |

OTHER PUBLICATIONS

Shao, H-R., et al., "802.11ah Channelization Proposal for US," IEEE Document No. IEEE 802.11-11/1516r0, Samsung Electronics, Nov. 7, 2011, 7 pages.

(Continued)

*Primary Examiner* — Anh-Vu Ly
(74) *Attorney, Agent, or Firm* — Dang M. Vo

(57) ABSTRACT

Certain aspects of the present disclosure provide methods and apparatus for the coexistence of 1 MHz and 2 MHz operation modes within a wireless communication system in accordance with IEEE 802.11ah, for example. One example method generally includes scanning a plurality of channel pairs, wherein each of the channel pairs comprises a first channel having a first channel designation and a second channel having a second channel designation; determining, based on the scan, a set of open channels from the plurality of channel pairs in which no other apparatus is operating; selecting a primary channel based on the determination; and transmitting using the selected primary channel. The selection of the primary channel involves channel selection rules disclosed herein.

13 Claims, 8 Drawing Sheets

(51) Int. Cl.
    *H04W 84/12*    (2009.01)
    *H04W 84/18*    (2009.01)

(56) References Cited

U.S. PATENT DOCUMENTS

| | | | |
|---|---|---|---|
| 2005/0190741 A1* | 9/2005 | Pettersson | 370/350 |
| 2006/0159003 A1* | 7/2006 | Nanda | H04W 16/10 370/203 |
| 2006/0280204 A1 | 12/2006 | Nagata et al. | |
| 2007/0105552 A1 | 5/2007 | Hun et al. | |
| 2007/0214286 A1* | 9/2007 | Muqattash et al. | 709/248 |
| 2007/0268862 A1* | 11/2007 | Singh et al. | 370/329 |
| 2008/0198801 A1 | 8/2008 | Kesselman et al. | |
| 2009/0285116 A1 | 11/2009 | Nanda et al. | |
| 2010/0046449 A1* | 2/2010 | Denteneer et al. | 370/329 |
| 2011/0096747 A1 | 4/2011 | Seok | |
| 2012/0082147 A1 | 4/2012 | Liu et al. | |
| 2012/0176974 A1 | 7/2012 | Abraham et al. | |
| 2012/0327870 A1 | 12/2012 | Grandhi et al. | |
| 2013/0077554 A1 | 3/2013 | Gauvreau et al. | |
| 2013/0107830 A1 | 5/2013 | Jones, IV et al. | |
| 2014/0079016 A1* | 3/2014 | Dai et al. | 370/330 |

OTHER PUBLICATIONS

International Preliminary Report on Patentability—PCT/US2012/062713, The International Bureau of WIPO—Geneva, Switzerland, Feb. 7, 2014.

International Search Report and Written Opinion—PCT/US2012/026713—ISA/EPO—Feb. 25, 2013.

Minyoung Park: "IEEE 802.11ac: Dynamic Bandwidth Channel Access", ICC 2011—2011 IEEE International Conference on Communications—Jun. 5-9, 2011—Kyoto, Japan, IEEE, Piscataway, NJ, USA, Jun. 5, 2011, pp. 1-5, XP031908841, DOI: 10.1109/ICC.2011.5963089ISBN: 978-1-61284-232-5 paragraph [II.A]—paragraph [11.B].

Rolf De Vegt: "Motions and Strawpoll on Channelization for 11 ah", IEEE 8O2.11-11/1329r0, Sep. 21, 2011, pp. 1-9, XP002691516.

Vegt R.D., "Channelization and Bandwidth Modes for 802.11ah," IEEE 802.11-11/1238r0, Sep. 18, 2011, 9 pages.

Vegt R.D., "Potential Channelization for 802.11ah," IEEE 802.11-11/1296r3, Sep. 18, 2011, 10 pages.

European Search Report—EP15188327—Search Authority—The Hague—Jan. 13, 2016.

European Search Report—EP15188900—Search Authority—The Hague—Jan. 18, 2016.

* cited by examiner

CHANNEL SELECTION RULES FOR SUB-1-GHZ BASIC SERVICE SETS

CROSS-REFERENCE TO RELATED APPLICATIONS

Claim of Priority Under 35 U.S.C. §120

The present Application for Patent is a Divisional of patent application Ser. No. 13/664,029 entitled "CHANNEL SELECTION RULES FOR SUB-1-GHz BASIC SERVICE SETS" filed Oct. 30, 2012, which claims priority to U.S. Provisional Patent Application Ser. No. 61/553,806, filed Oct. 31, 2011, and assigned to the assignee hereof and hereby expressly incorporated by reference herein.

BACKGROUND

1. Field of the Invention

Certain aspects of the present disclosure generally relate to wireless communications and, more particularly, to channel selection rules for sub-1-GHz basic service sets (BSSs).

2. Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system and a transmitter. The processing system is generally configured to scan a plurality of channel pairs, wherein each of the channel pairs comprises a first channel having a first channel designation and a second channel having a second channel designation; to determine, based on the scan, a set of open channels from the plurality of channel pairs in which no other apparatus is operating; and to select a primary channel based on the determination. The selection typically includes selecting one member from the set of open channels as the primary channel if the one member has the first channel designation, selecting one member from the set of open channels having the second channel designation as the primary channel if no member from the set of open channels has the first channel designation, or selecting the first channel from one of the plurality of channel pairs as the primary channel if the set of open channels is an empty set. The transmitter is generally configured to transmit using the selected primary channel.

Certain aspects of the present disclosure provide a method for wireless communications. The method generally includes scanning a plurality of channel pairs, wherein each of the channel pairs comprises a first channel having a first channel designation and a second channel having a second channel designation; determining, based on the scan, a set of open channels from the plurality of channel pairs in which no other apparatus is operating; selecting a primary channel based on the determination; and transmitting using the selected primary channel. The selection of the primary channel typically includes selecting one member from the set of open channels as the primary channel if the one member has the first channel designation, selecting one member from the set of open channels having the second channel designation as the primary channel if no member from the set of open channels has the first channel designation, or selecting the first channel from one of the plurality of channel pairs as the primary channel if the set of open channels is an empty set.

Certain aspects of the present disclosure provide a first apparatus for wireless communications. The first apparatus generally includes means for scanning a plurality of channel pairs, wherein each of the channel pairs comprises a first channel having a first channel designation and a second channel having a second channel designation; means for determining, based on the scan, a set of open channels from the plurality of channel pairs in which no other apparatus is operating; means for selecting a primary channel based on the determination; and means for transmitting using the selected primary channel. The selection of the primary channel typically includes selecting one member from the set of open channels as the primary channel if the one member has the first channel designation, selecting one member from the set of open channels having the second channel designation as the primary channel if no member from the set of open channels has the first channel designation, or selecting the first channel from one of the plurality of channel pairs as the primary channel if the set of open channels is an empty set.

Certain aspects of the present disclosure provide a computer-program product for wireless communications. The computer-program product generally includes a computer-readable medium having instructions executable to scan a plurality of channel pairs, wherein each of the channel pairs comprises a first channel having a first channel designation and a second channel having a second channel designation; to determine, based on the scan, a set of open channels from the plurality of channel pairs in which no other apparatus is operating; to select a primary channel based on the determination; and to transmit using the selected primary channel. The selection of the primary channel typically includes selecting one member from the set of open channels as the primary channel if the one member has the first channel designation, selecting one member from the set of open channels having the second channel designation as the primary channel if no member from the set of open channels has the first channel designation, or selecting the first channel from one of the plurality of channel pairs as the primary channel if the set of open channels is an empty set.

Certain aspects of the present disclosure provide an access point. The access point generally includes at least one antenna, a processing system, and a transmitter. The processing system is generally configured to scan a plurality of channel pairs, wherein each of the channel pairs comprises a first channel having a first channel designation and a second channel having a second channel designation; to determine, based on the scan, a set of open channels from the plurality of channel pairs in which no other apparatus is operating; and to select a primary channel based on the determination. The selection typically includes selecting one member from the set of open channels as the primary channel if the one member has the first channel designation, selecting one member from the set of open channels having the second channel designation as the primary channel if no member from the set of open channels has the first channel designation, or selecting the first channel from one of the plurality of channel pairs as the primary channel if the set of open channels is an empty set. The transmitter is generally configured to transmit using the selected primary channel, via the at least one antenna.

Certain aspects of the present disclosure provide a first apparatus for wireless communications. The first apparatus generally includes a transmitter and a receiver. The transmitter is typically configured to transmit a first transmission using a first channel of a channel pair, the channel pair including the first channel and a second channel. The receiver is generally configured to receive a second transmission from a second apparatus, wherein the second transmission is received on both the first and second channels of the channel pair, wherein one of the first and second channels is designated as a primary channel for the second apparatus, and wherein the receiver is configured to receive the second transmission regardless whether the first channel or the second channel is designated as the primary channel.

Certain aspects of the present disclosure provide a method for wireless communications. The method generally includes transmitting, from a first apparatus, a first transmission using a first channel of a channel pair, the channel pair including the first channel and a second channel; and receiving a second transmission from a second apparatus, wherein the second transmission is received on both the first and second channels of the channel pair, wherein one of the first and second channels is designated as a primary channel for the second apparatus, and wherein the second transmission is received regardless whether the first channel or the second channel is designated as the primary channel.

Certain aspects of the present disclosure provide a first apparatus for wireless communications. The first apparatus generally includes means for transmitting a first transmission using a first channel of a channel pair, the channel pair including the first channel and a second channel; and means for receiving a second transmission from a second apparatus, wherein the second transmission is received on both the first and second channels of the channel pair, wherein one of the first and second channels is designated as a primary channel for the second apparatus, and wherein the means for receiving is configured to receive the second transmission regardless whether the first channel or the second channel is designated as the primary channel.

Certain aspects of the present disclosure provide a computer-program product for wireless communications. The computer-program product generally includes a computer-readable medium having instructions executable to transmit a first transmission using a first channel of a channel pair, the channel pair including the first channel and a second channel; and to receive a second transmission from an apparatus, wherein the second transmission is received on both the first and second channels of the channel pair, wherein one of the first and second channels is designated as a primary channel for the apparatus, and wherein the second transmission is received regardless whether the first channel or the second channel is designated as the primary channel.

Certain aspects of the present disclosure provide an access point. The access point generally includes at least one antenna, a transmitter, and a receiver. The transmitter is typically configured to transmit, via the at least one antenna, a first transmission using a first channel of a channel pair, the channel pair including the first channel and a second channel. The receiver is generally configured to receive, via the at least one antenna, a second transmission from a second apparatus, wherein the second transmission is received on both the first and second channels of the channel pair, wherein one of the first and second channels is designated as a primary channel for the second apparatus, and wherein the receiver is configured to receive the second transmission regardless whether the first channel or the second channel is designated as the primary channel.

Certain aspects of the present disclosure provide a first apparatus for wireless communications. The first apparatus generally includes a processing system and a transmitter. The processing system is typically configured to scan a plurality of channel pairs, wherein each of the channel pairs includes a first channel and a second channel; and based on the scan, to select the first channel or the second channel from one of the plurality of channel pairs as a primary channel, such that the primary channel is not the same as a secondary channel of a second apparatus communicatively coupled to the first apparatus. The transmitter is generally configured to transmit using the selected primary channel.

Certain aspects of the present disclosure provide a method for wireless communications. The method generally includes scanning a plurality of channel pairs at a first apparatus, wherein each of the channel pairs includes a first channel and a second channel; based on the scan, selecting the first channel or the second channel from one of the plurality of channel pairs as a primary channel, such that the primary channel is not the same as a secondary channel of a second apparatus communicatively coupled to the first apparatus; and transmitting using the selected primary channel.

Certain aspects of the present disclosure provide a first apparatus for wireless communications. The first apparatus generally includes means for scanning a plurality of channel pairs, wherein each of the channel pairs includes a first channel and a second channel; means for selecting, based on the scan, the first channel or the second channel from one of the plurality of channel pairs as a primary channel, such that the primary channel is not the same as a secondary channel of a second apparatus communicatively coupled to the first apparatus; and means for transmitting using the selected primary channel.

Certain aspects of the present disclosure provide a computer-program product for wireless communications. The computer-program product generally includes a computer-readable medium having instructions executable to scan a plurality of channel pairs at a first apparatus, wherein each of the channel pairs includes a first channel and a second channel; based on the scan, to select the first channel or the second channel from one of the plurality of channel pairs as a primary channel, such that the primary channel is not the same as a secondary channel of a second apparatus communicatively coupled to the first apparatus; and to transmit using the selected primary channel.

Certain aspects of the present disclosure provide an access point. The access point generally includes at least one antenna, a processing system, and a transmitter. The processing system is typically configured to scan a plurality of channel pairs, wherein each of the channel pairs includes a first channel and a second channel; and based on the scan, to select the first channel or the second channel from one of the plurality of channel pairs as a primary channel, such that the primary channel is not the same as a secondary channel of an apparatus communicatively coupled to the access point. The transmitter is generally configured to transmit using the selected primary channel, via the at least one antenna.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
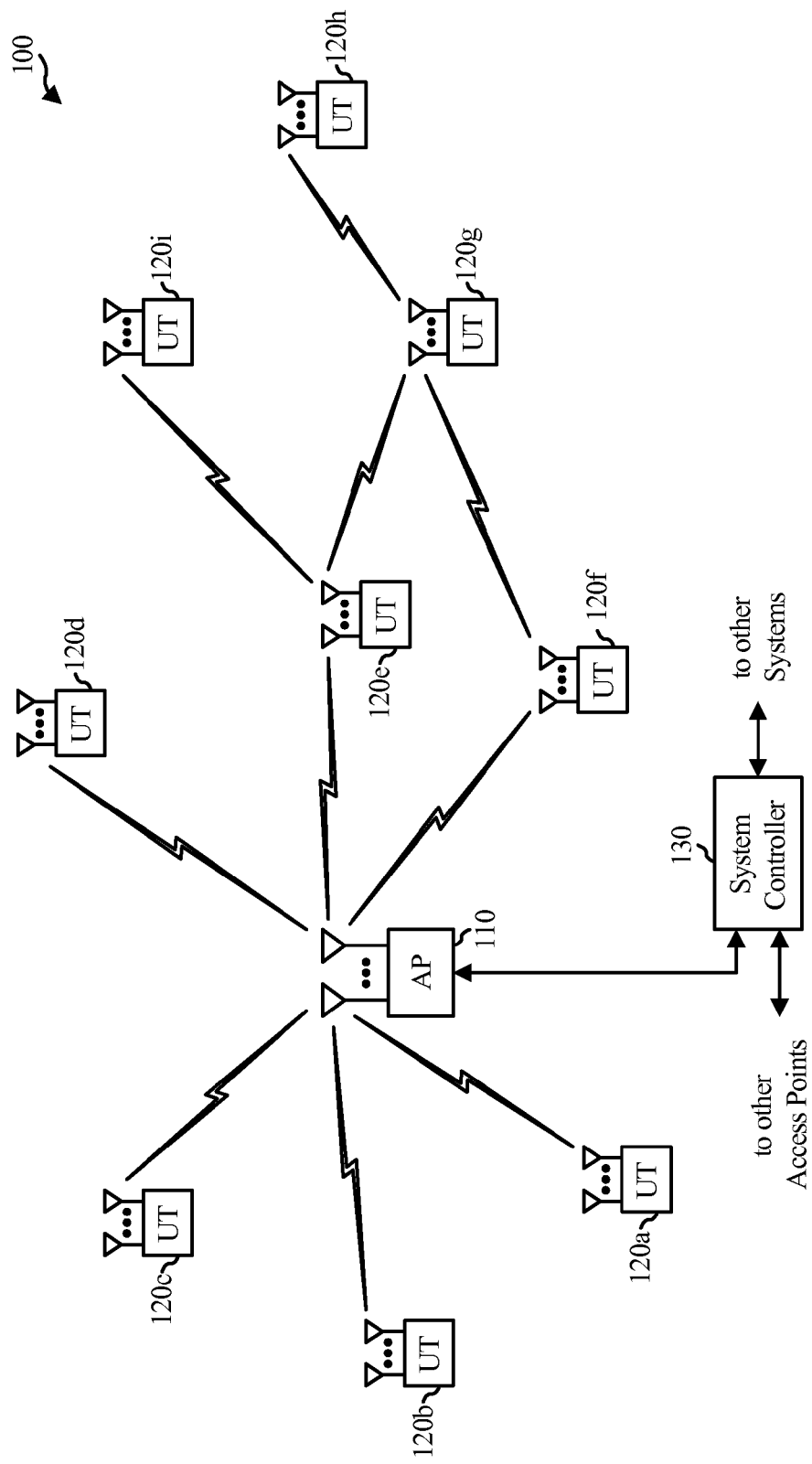
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

AN EXAMPLE WIRELESS COMMUNICATION SYSTEM

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
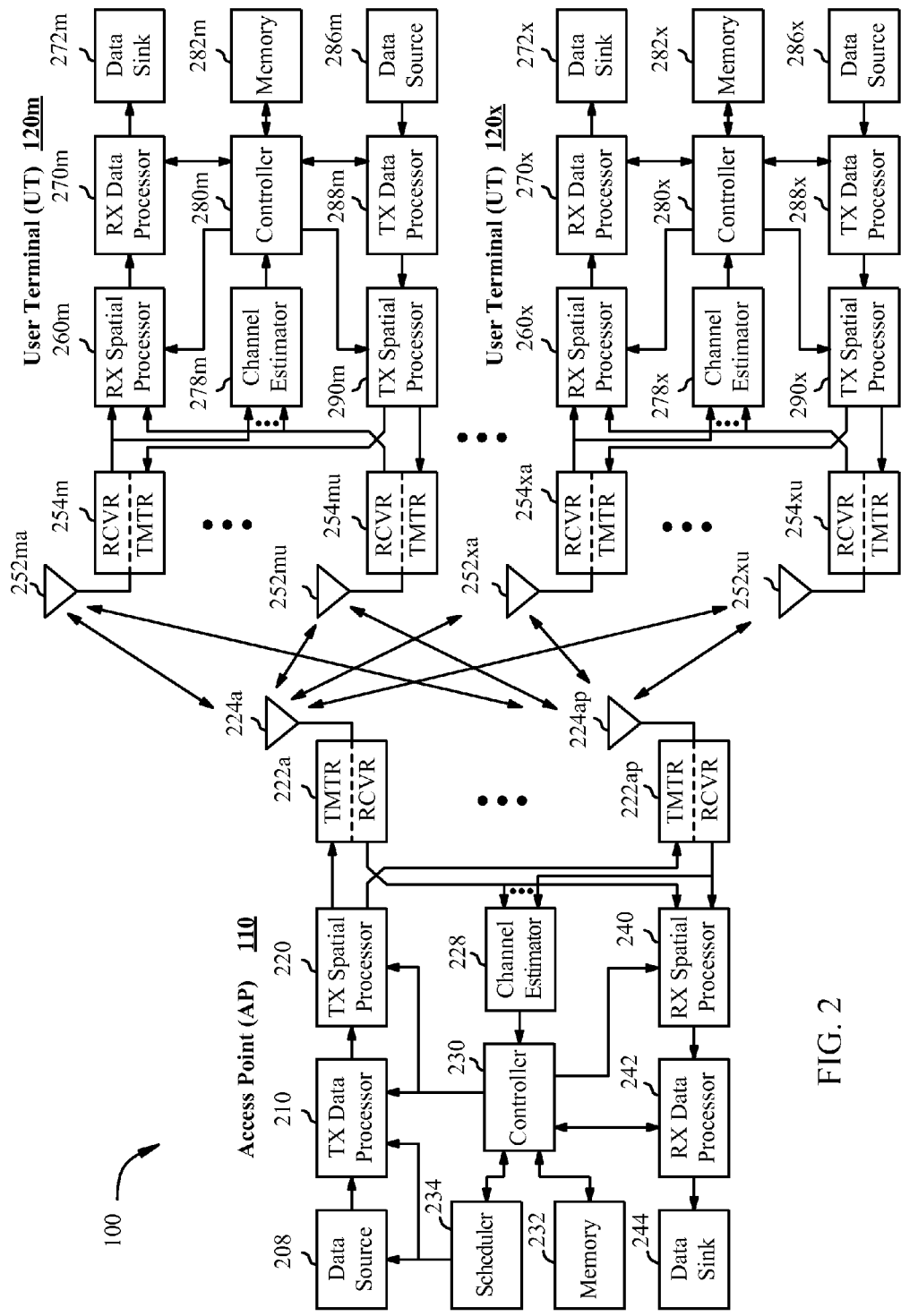
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
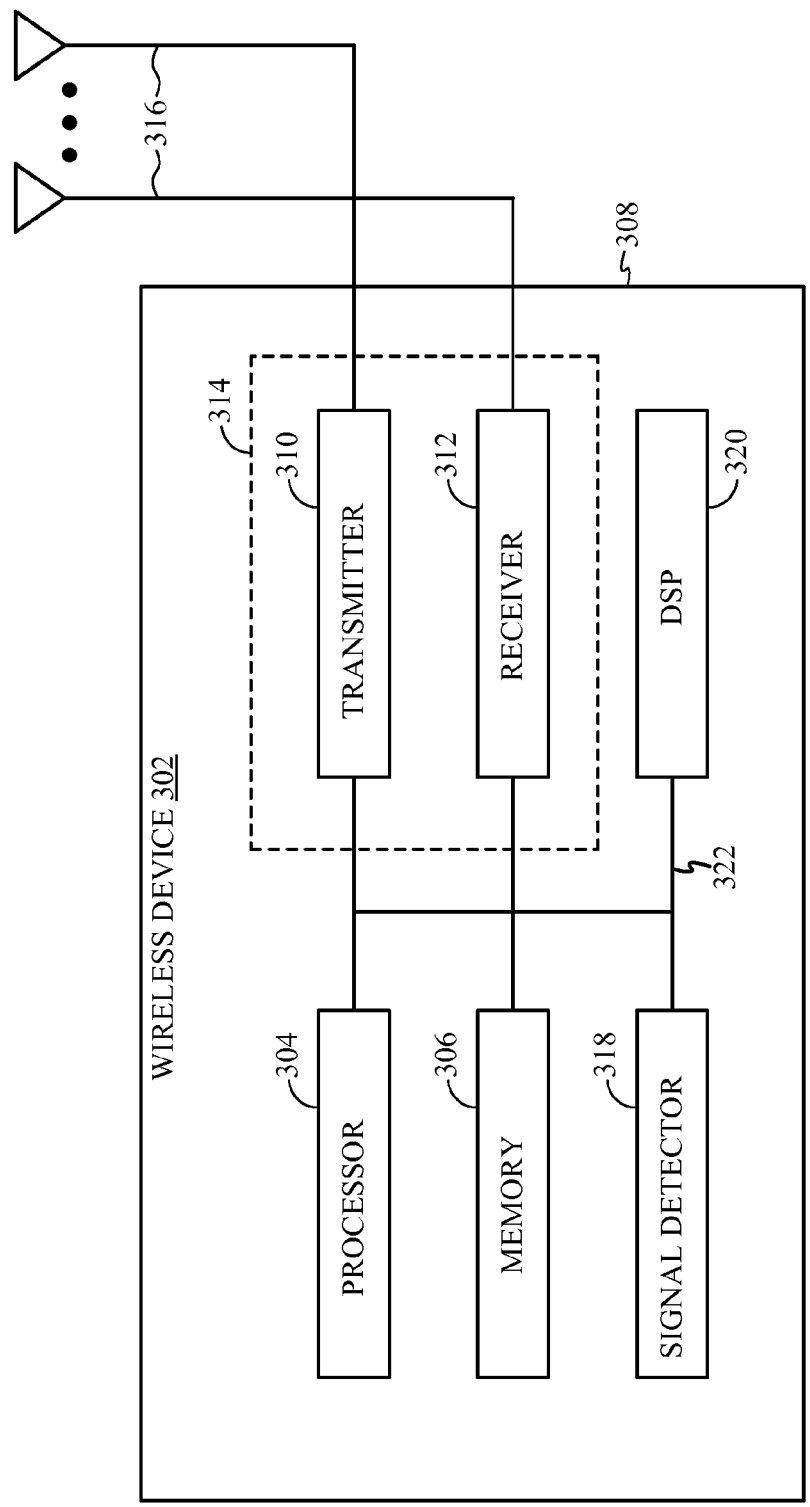
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example 1 MHz and 2 MHz Channelization

For IEEE 802.11ah, coexistence between 1 MHz and 2 MHz channels has been proposed in accordance with two options. One option is to implement only 2 MHz channelization in the United States. In this case, basic service sets (BSSs) may make 1 MHz transmissions only in the lower (or upper) portion of a channel pair, thereby effectively yielding thirteen (13) 1 MHz channels. The other option is to not only implement 2 MHz channels, but to also implement 1 MHz channels in the United States. Through this implementation, twenty-six (26) 1 MHz channels may be available for utilization. Given these two options, certain aspects of the present disclosure utilize the latter option as described in the following paragraphs.

A global channelization scheme has been proposed and adopted. The United States may utilize a communication system comprising a frequency range of 902-928 MHz, a bandwidth of 26 MHz, an unknown number of 1 MHz channels, thirteen 2 MHz channels, and six 4 MHz channels. In addition, Europe may utilize a communication system comprising a frequency range of 863-868.6 MHz, a bandwidth of 5.6 MHz, five 1 MHz channels, two 2 MHz channels, and one 4 MHz channel. Japan may utilize a communication system comprising a frequency range of 915.9-928.1 MHz, a bandwidth of 12.2 MHz with a maximum allowed bandwidth of 1 MHz, eleven 1 MHz channels, approximately five 2 MHz channels, and approximately two 4 MHz channels. Korea may utilize a communication system comprising a frequency range of 917-923.5 MHz, a bandwidth of 6.5 MHz, six 1 MHz channels, three 2 MHz channels, and one 4 MHz channel. China may utilize a communication system comprising a frequency range of 755-787 MHz, a bandwidth of 32 MHz with a maximum allowed bandwidth of 1 MHz in the 755-779 MHz frequency range, thirty-two 1 MHz channels, four 2 MHz channels, and two 4 MHz channels.

There are several reasons for implementing 1 MHz channelization within the United States. First, 1 MHz channelization may help create uniformity with the rest of the world. There are other locations that utilize a plurality of 1 MHz channels. For example, China utilizes thirty-two (32) 1 MHz channels within the 779-787 MHz range. Another reason for implementing the 1 MHz channelization is that there is no regulatory hurdle that prevents the 1 MHz channelization in the United States. Furthermore, utilizing 1 MHz channelization in the United States involves no increase in complexity. The possibility of a 1 MHz channel existing in both halves already exists in other regions (e.g., Europe, Korea, and China). Therefore, the 1 MHz channelization systems from other countries may be re-used by the United States, with similar issues and solutions. The arguments supporting 2 MHz channelization tend to be weak: that 13 channels are "enough" for most use cases and is more than most regions. Finally, although the desire to promote deployment of 2 MHz BSSs is understandable, 2 MHz channels may still be respected in other ways. For example, scanning or channel selection rules may be designed that force 1 MHz networks to avoid the secondary channel of 2 MHz BSSs.

In order to have coexistence of 1 MHz and 2 MHz channels, reception of 1 MHz and 2 MHz transmissions may be desirable. However, it may also suffice if 1 MHz decoding is mandatory only on the lower 1 MHz channel in a 2 MHz BSS.

The communication schemes for 1 MHz and 2 MHz channelization may follow similar rules as IEEE 802.11n for overlapping BSSs. In other words, the coexistence between a 1 MHz and 2 MHz BSS in an 802.11ah communication system may be similar to the coexistence between a 20 MHz and 40 MHz BSS in an IEEE 802.11n communication system. Overlapping 2 MHz BSSs may be designed to use the same primary channel. The only difference may be that deferral on the secondary channel based on energy detection may be both ways in the 802.11ah system because the signal field (SIG) may not be replicated in the secondary channel.

Another way to support coexistence of 1 MHz and 2 MHz channels may be through the introduction of more restrictive rules to further protect 2 MHz BSSs. For example, 2 MHz BSSs may be allowed to have primary channels on odd channels (or even channels) only. Another example restrictive rule would be to have BSSs capable of transmitting only 1 MHz signals (i.e., "1-MHz-only transmit BSSs") to decode 2 MHz transmissions irrespective of their locations on odd or even channels. Similar to 802.11n communication systems, such a restrictive rule may enable preamble detection associated with clear channel assessment (CCA) to 2 MHz transmissions.

With the implementation of the 2 MHz option, 1 MHz transmissions may only be sent on odd-numbered (or even-numbered) channels. In other words, 1-MHz-only transmit BSSs may exist only on odd (or even) channels within a 2 MHz channel system. The benefits of this option may include the protection of 2 MHz BSSs by default and the absence of rules to ensure co-existence of 1 MHz and 2 MHz channel systems because the odd (or even) channel may implicitly be the primary channel. However, the downfall is that the number of 1 MHz BSSs may be limited to 13, which may be insufficient with the high network traffic in the United States.

For 1 MHz channelization, a 1-MHz-only transmit BSS may exist on any channel. To honor 2 MHz reception, a 1-MHz-only transmit BSS that receives a transmission on an odd channel may look for a 2 MHz transmission, which includes the odd channel and an additional even channel on the right (i.e., the next highest channel according to frequency). A 1-MHz-only transmit BSS that receives a transmission on an even channel may look for a 2 MHz transmission, which includes the even channel and an additional odd channel on the left (i.e., the next lowest channel by frequency). A 2 MHz BSS may still make 1 MHz transmissions only on odd channels. The above scheme for 1 MHz channelization allows twenty-six (26) 1 MHz BSSs, coexistence similar to 802.11n, and re-use of solutions for other regions, such as China, EU, and Korea. However, coexistence on secondary channels may be performed based on energy detection both ways. In 802.11n, a 40 MHz device performs energy detection to a 20 MHz device on the secondary, but not vice versa. In 802.11ah, since SIG is not duplicated in 1 MHz chunks, energy detection may be the only mechanism both ways.

Coexistence Between 1 MHz and 2 MHz Operation Modes

Certain aspects of the present disclosure provide for the implementation of 1 MHz channelization with coexistence between 1 MHz and 2 MHz operation modes. It may be assumed that a 2 MHz station (STA) is able to decode a 1 MHz transmission only on the lower (or upper) 1 MHz channel, and 2 MHz reception may be supported. Whenever a STA transmits a 2 MHz packet, every other STA camping in that 2 MHz channel may receive the packet (and defer). Similarly, a STA may transmit a 1 MHz packet only on the primary channel. Every STA camping in that channel may receive the packet (and defer), e.g., within the 1 MHz range. Every STA camping in the other 1 MHz channel need not decode the packet, but may defer based on energy detection on the secondary channel.

Implementation of 1 MHz channelization within the United States may involve different options for channel selection rules. One such option may involve using similar channel selection rules as those in IEEE 802.11n. For example, each 2 MHz BSS may choose any 1 MHz channel, odd or even. BSSs may most likely avoid using the same 2 MHz channels. If an access point (AP) chooses the same 2 MHz channel as an existing BSS, this AP may most likely select its primary channel to align with the primary channel of the existing BSS, unless there is a primary channel in any of the two 1 MHz channels. This facilitates coexistence with the network allocation vector (NAV) distribution on the primary channel. However, even with this rule, two BSSs may operate with different primary channels within the same 2 MHz channel. If this is the case, 1 MHz transmissions on the secondary channel may be detected only through energy detection (ED), which may be a weaker detection method and may not involve NAV.

Another option for channel selection rules may comprise a new selection procedure according to certain aspects of the present disclosure. Under this set of channel selection rules, a 1 MHz "default" primary channel may be defined within a 2 MHz bandwidth. The default primary channel may be defined as always the lower (or upper) half of a 2 MHz bandwidth or what is defined by the 802.11ah amendment to the standard. An AP operating at 1 MHz only (i.e., a 1-MHz-only transmit BSS) may select the channel by: (1) looking for and selecting a default 1 MHz channel where no BSS is operating (1 or 2 MHz BSSs), if any; (2) if no default channel is available, then selecting a "non-default" channel where no BSS is operating (these may be available because some BSSs are operating at 1 MHz); and (3) if no such channels are available, then selecting any default channel. If an AP is operating at 1 MHz with the primary channel on a non-default channel, upon detecting a 2 MHz BSS, the 1 MHz AP may select a new primary channel according to the aforementioned procedure or simply move to the default channel within the same 2 MHz bandwidth (pair of 1 MHz channels, or channel pair). An AP operating at 2 MHz may most likely set the primary channel to a default channel, for example, by selecting first the channels where no BSS is operating.

Deferral to a transmission happens within the reception range for its transmit bandwidth. Accordingly, deferral to 2 MHz transmissions may occur within a smaller range than deferral to 1 MHz transmissions. Remote STAs that may receive only 1 MHz packets from an AP may be hidden from 2 MHz transmissions from the AP (no SIG/NAV deferral, only energy detection). If an AP sends a 2 MHz packet, other remote STAs may start transmission anyway and cause collisions. Therefore, the AP may use 2 MHz mode and higher power so that remote STAs are also covered. Furthermore, the AP may send a 1 MHz request to send (RTS)/CTS (clear to send) message before a 2 MHz transmission.

Figure 4:
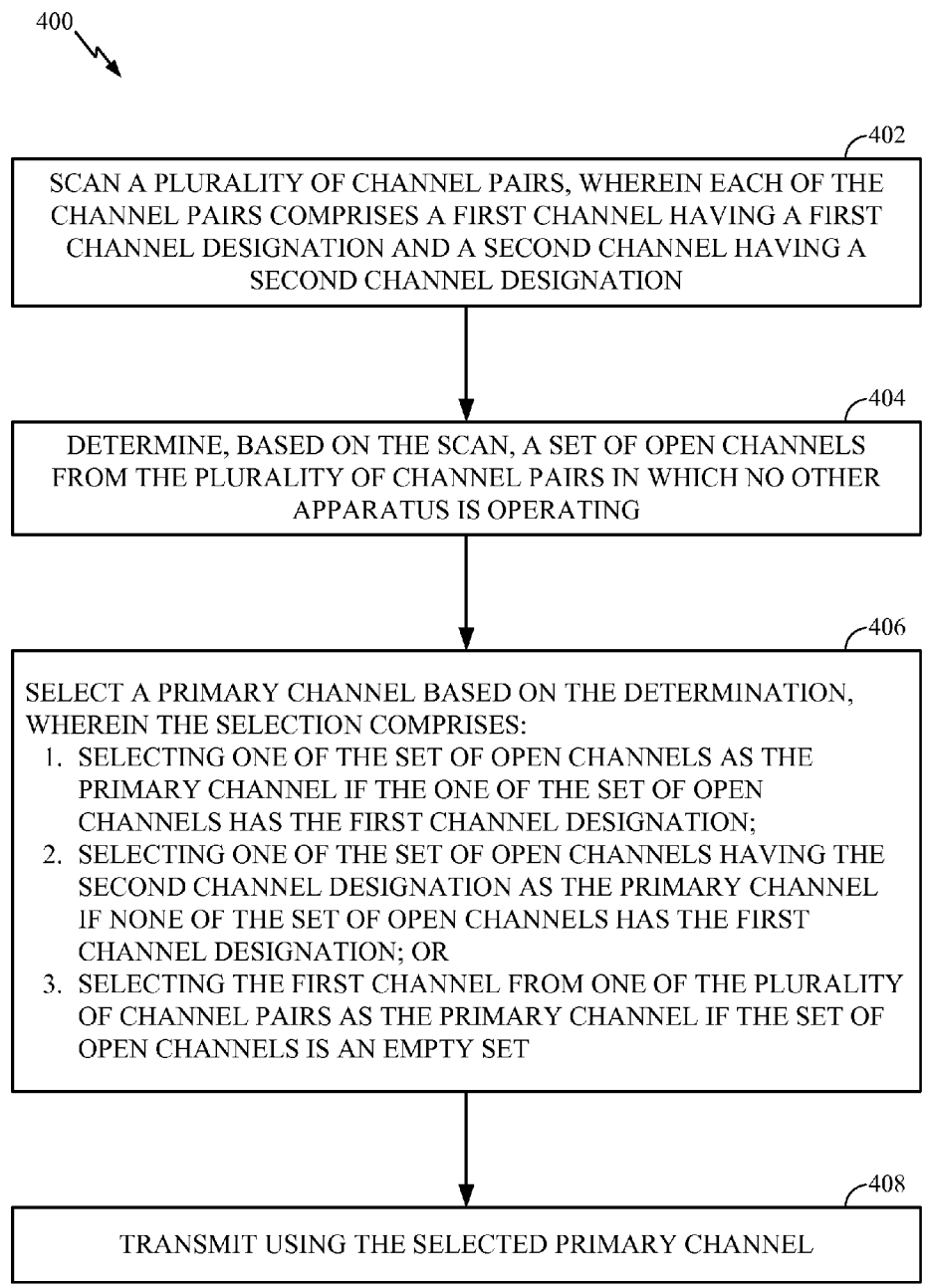
FIG. 4 illustrates a block diagram of example operations for selecting and transmitting on a primary channel, in accordance with certain aspects of the present disclosure.

FIG. 4 is a block diagram of example operations 400 for determining and transmitting on a primary channel. The operations 400 may be performed by an apparatus, such as an AP. At 402, the AP may scan a plurality of channel pairs, wherein each of the channel pairs comprises a first channel having a first channel designation and a second channel having a second channel designation. At 404, the AP may determine, based on the scan, a set of open channels from the plurality of channel pairs in which no other apparatus is operating. At 406, the AP may select a primary channel based on the determination. The selection may comprise: (1) selecting one of the set of open channels as the primary channel if the one of the set of open channels has the first channel designation; (2) selecting one of the set of open channels having the second channel designation as the primary channel if none of the set of open channels has the first channel designation; or (3) selecting the first channel from one of the plurality of channel pairs as the primary channel if the set of open channels is an empty set. At 408, the AP may transmit using the selected primary channel.

For certain aspects, each of the first and second channels has a channel width of about 1 MHz. Each of the plurality of channel pairs may have a bandwidth of about 2 MHz. According to certain aspects, the first channel designation indicates a default channel, and the second channel designation may indicate a non-default channel. For certain aspects, the first channel in each of the plurality of channel pairs occupies a lower bandwidth than the second channel in each of the plurality of channel pairs. For certain aspects, determining the set of open channels may include detecting energy in the first and second channels of each of the plurality of channel pairs, such that any of the first and second channels having a detected energy below a threshold (or equal to or below the threshold) are added to the set of open channels.

According to certain aspects, in each of the plurality of channel pairs, the first channel is an odd channel and the second channel is an even channel. The operations 400 may further include receiving a transmission on the odd channel or the even channel in one of the plurality of channel pairs and checking for reception of the transmission on both the odd channel and the even channel in the same one of the plurality of channel pairs, wherein the even channel occupies a higher bandwidth than the odd channel.

For certain aspects, the operations 400 may further include detecting an apparatus using a channel pair associated with the selected primary channel, wherein the selected primary channel has a second channel designation, and selecting a new primary channel. Selecting the new primary channel may include selecting the first channel of the channel pair as the new primary channel; selecting one member from the set of open channels as the new primary channel if the one member from the set of open channels has the first channel designation; selecting one member from the set of open channels having the second channel designation as the new primary channel if no member from the set of open channels has the first channel designation; or selecting the first channel from one of the plurality of channel pairs, other than the channel pair being used by the other apparatus, as the new primary channel if the set of open channels is an empty set.

Figure 5:
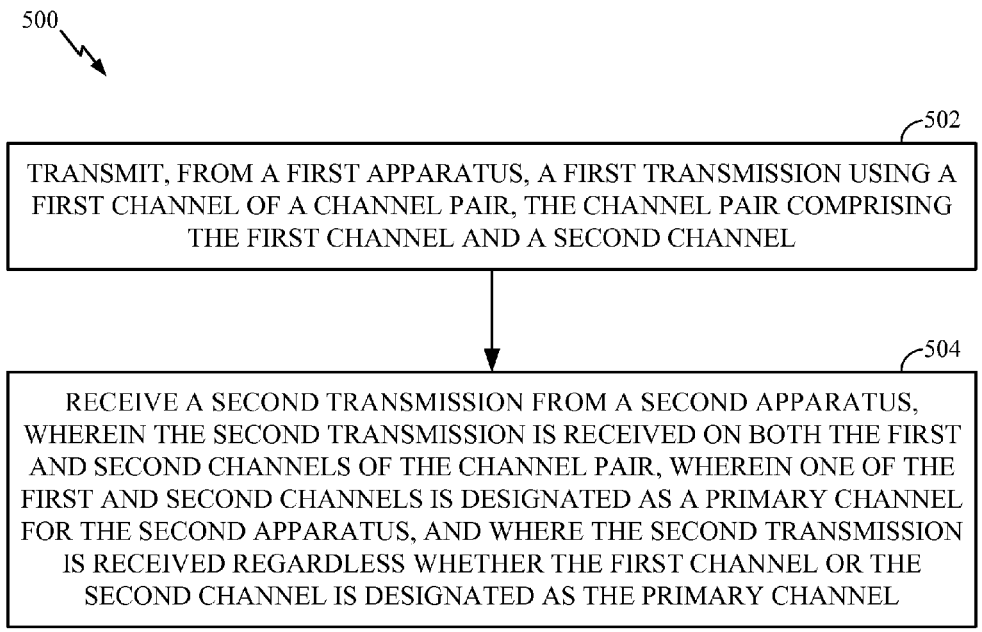
FIG. 5 illustrates a block diagram of example operations for transmitting and receiving on a channel pair, in accordance with certain aspects of the present disclosure.
Figure 5A:
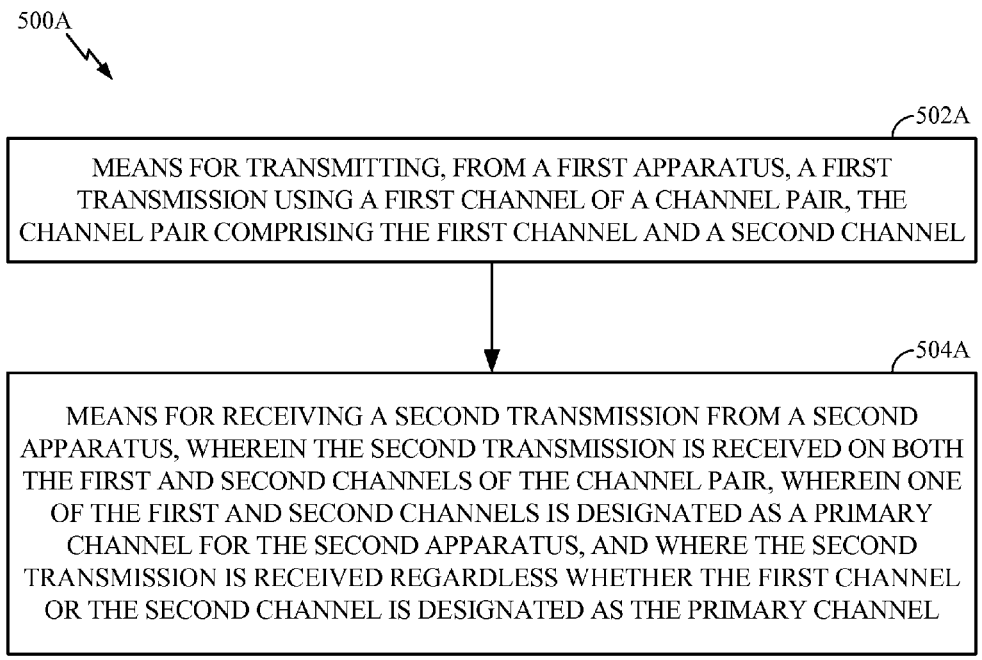
FIG. 5A illustrates example means capable of performing the operations shown in FIG. 5.

FIG. 5 is a block diagram of example operations 500 for transmitting and receiving on a channel pair. The operations 500 may be performed by a first apparatus, such as an AP. At 502, the first apparatus may transmit a first transmission using a first channel of a channel pair, the channel pair comprising the first channel and a second channel. At 504, the first apparatus may receive a second transmission from a second apparatus (e.g., another AP belonging to a different BSS), wherein the second transmission is received on both the first and second channels of the channel pair, wherein one of the first and second channels is designated as a primary channel for the second apparatus, and wherein the second transmission is received regardless whether the first channel or the second channel is designated as the primary channel. According to certain aspects, the operations 500 may involve refraining from accessing a wireless medium for at least a duration of the reception of the second transmission.

For certain aspects, the operations 500 may further include determining that the first channel is designated as a secondary channel for the second apparatus and terminating operation on the first channel based on the determination. The operations 500 may also include receiving, from a third apparatus, a message indicating that the first channel is designated as the secondary channel of the second apparatus. The determination may be based on the message received from the third apparatus. The operations 500 may also include transmitting, after the termination, a third transmission on the second channel of the same channel pair or on a first channel or a second channel of a different channel pair.

According to certain aspects, the first channel is an even channel of the channel pair, the second channel is an odd channel of the channel pair, and the even channel occupies a higher bandwidth than the odd channel. Each of the first and second channels may have a channel width of about 1 MHz, and the channel pair may have a bandwidth of about 2 MHz.

Figure 6:
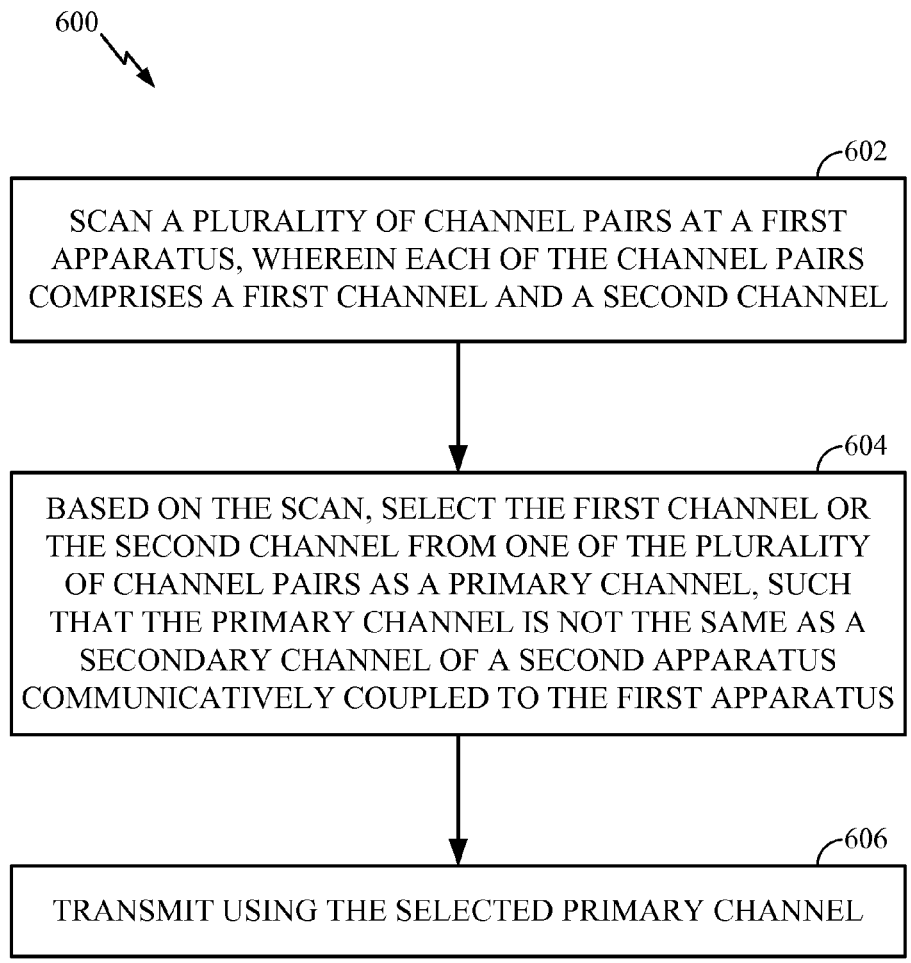
FIG. 6 illustrates a block diagram of example operations for selecting a primary channel by avoiding selecting a secondary channel for another apparatus as the primary channel, in accordance with certain aspects of the present disclosure.
Figure 6A:
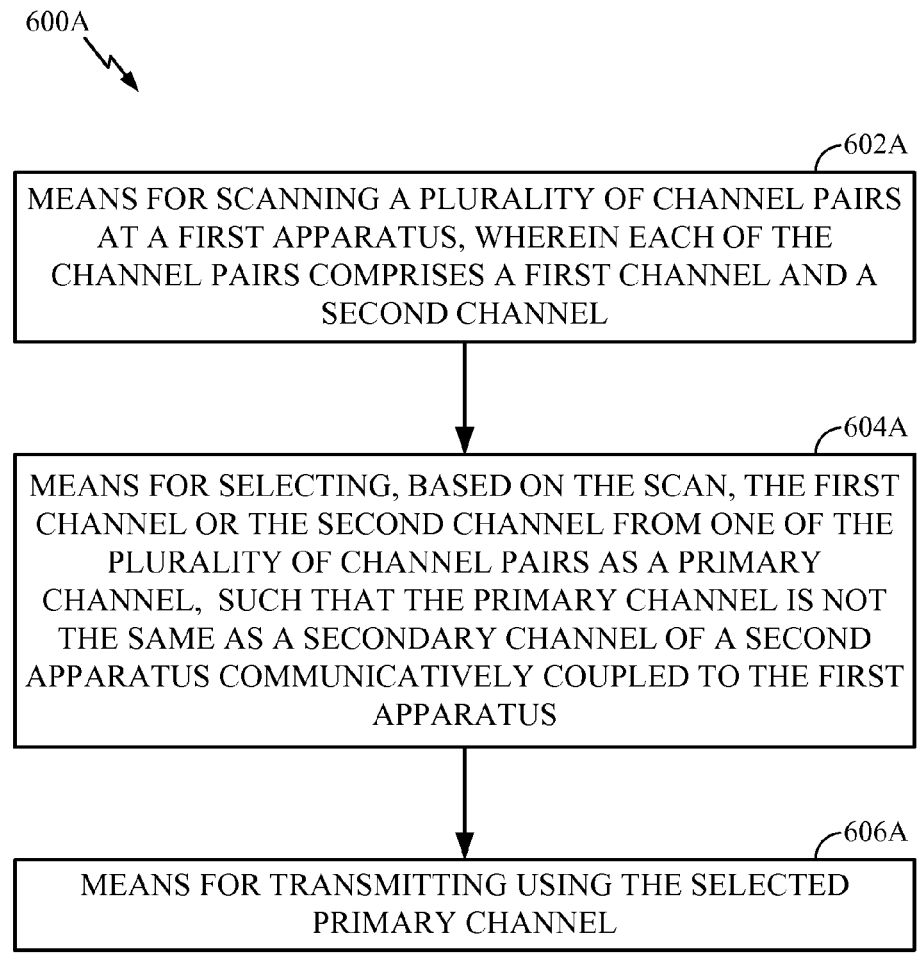
FIG. 6A illustrates example means capable of performing the operations shown in FIG. 6.

FIG. 6 is a block diagram of example operations 600 for selecting a primary channel. The operations 600 may be performed by a first apparatus, such as an AP. At 602, the first apparatus may scan a plurality of channel pairs, wherein each of the channel pairs comprises a first channel and a second channel. At 604, the first apparatus may, based on the scan, select the first channel or the second channel from one of the plurality of channel pairs as a primary channel. This selection at 604 involves avoiding selection of a secondary channel for a second apparatus (e.g., another AP belonging to a different BSS) as the primary channel for the first apparatus. In other words, the primary channel is not the same as a secondary channel of a second apparatus communicatively coupled (e.g., via a wireless medium or a backhaul) to the first apparatus. At 606, the first apparatus may transmit using the selected primary channel. According to certain aspects, the operations 600 may further include receiving a transmission from the second apparatus. The transmission may be received simultaneously on both the first and second channels of one of the plurality of channel pairs.

For certain aspects, each of the first and second channels has a channel width of about 1 MHz. Each of the plurality of channel pairs may have a bandwidth of about 2 MHz.

Figure 4A:
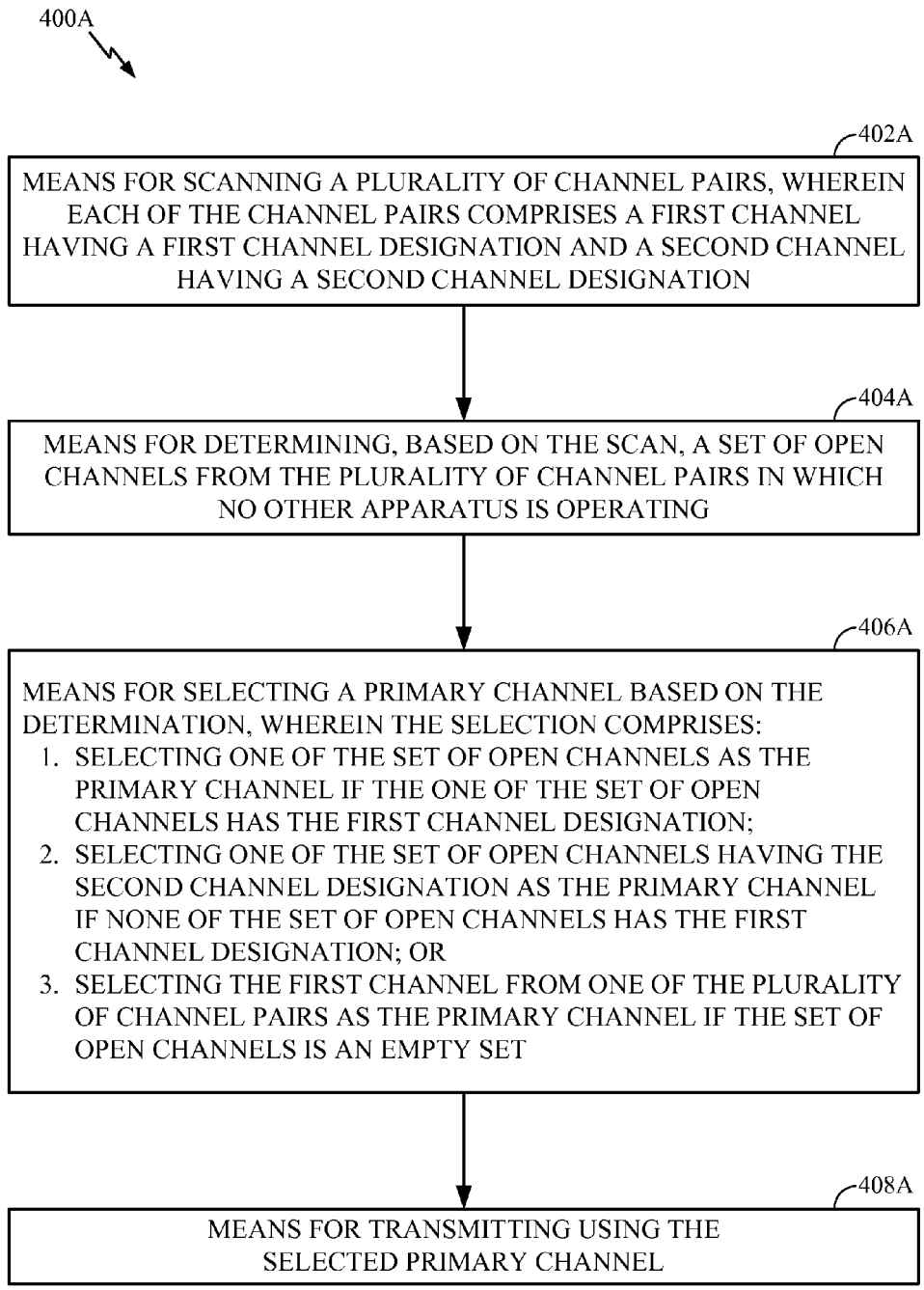
FIG. 4A illustrates example means capable of performing the operations shown in FIG. 4.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
　a transmitter configured to transmit a first transmission using a first channel of a channel pair, the channel pair comprising the first channel and a second channel;
　a receiver configured to receive a second transmission from a second apparatus, wherein the second transmission is received on both the first and second channels of the channel pair, wherein one of the first and second channels is designated as a primary channel for the second apparatus, and wherein the receiver is configured to receive the second transmission regardless whether the first channel or the second channel is designated as the primary channel; and
　a processing system configured to:
　　determine that the first channel is designated as a secondary channel for the second apparatus; and after the determination, designate the second channel as the primary channel for the first apparatus, wherein the first apparatus and the second apparatus belong to different basic service sets (BSS).

2. The first apparatus of claim 1, wherein the receiver is configured to receive, from a third apparatus, a message indicating that the first channel is designated as the secondary channel of the second apparatus and wherein the determination is based on the message.

3. The first apparatus of claim 1, wherein after the termination, the transmitter is configured to transmit a third transmission on the second channel of the same channel pair or on a first channel or a second channel of a different channel pair.

4. The first apparatus of claim 1, wherein each of the first and second channels has a channel width of about 1 MHz and wherein the channel pair has a bandwidth of about 2 MHz.

5. The first apparatus of claim 1, wherein the transmitter is further configured to refrain from accessing a wireless medium for at least a duration of the reception of the second transmission.

6. A first apparatus for wireless communications, comprising:
a transmitter configured to transmit a first transmission using a first channel of a channel pair, the channel pair comprising the first channel and a second channel; and
a receiver configured to receive a second transmission from a second apparatus, wherein the second transmission is received on both the first and second channels of the channel pair, wherein one of the first and second channels is designated as a primary channel for the second apparatus, wherein the receiver is configured to receive the second transmission regardless whether the first channel or the second channel is designated as the primary channel, wherein the first channel is an even channel of the channel pair, wherein the second channel is an odd channel of the channel pair, and wherein the even channel occupies a higher bandwidth than the odd channel.

7. A method for wireless communications, comprising:
transmitting, from a first apparatus, a first transmission using a first channel of a channel pair, the channel pair comprising the first channel and a second channel;
receiving a second transmission from a second apparatus, wherein the second transmission is received on both the first and second channels of the channel pair, wherein one of the first and second channels is designated as a primary channel for the second apparatus, and wherein the second transmission is received regardless whether the first channel or the second channel is designated as the primary channel;
determining that the first channel is designated as a secondary channel for the second apparatus; and
after the determination, designating the second channel as the primary channel for the first apparatus, wherein the first apparatus and the second apparatus belong to different basic service sets (BSS).

8. The method of claim 7, further comprising receiving, from a third apparatus, a message indicating that the first channel is designated as the secondary channel of the second apparatus, wherein the determination is based on the message.

9. The method of claim 7, further comprising transmitting, after the termination, a third transmission on the second channel of the same channel pair or on a first channel or a second channel of a different channel pair.

10. The method of claim 7, wherein each of the first and second channels has a channel width of about 1 MHz and wherein the channel pair has a bandwidth of about 2 MHz.

11. The method of claim 7, further comprising refraining from accessing a wireless medium for at least a duration of the reception of the second transmission.

12. A method for wireless communications, comprising:
transmitting, from a first apparatus, a first transmission using a first channel of a channel pair, the channel pair comprising the first channel and a second channel;
receiving a second transmission from a second apparatus, wherein the second transmission is received on both the first and second channels of the channel pair, wherein one of the first and second channels is designated as a primary channel for the second apparatus, wherein the second transmission is received regardless whether the first channel or the second channel is designated as the primary channel, wherein the first channel is an even channel of the channel pair, wherein the second channel is an odd channel of the channel pair, and wherein the even channel occupies a higher bandwidth than the odd channel.

13. An access point, comprising:
at least one antenna;
a transmitter configured to transmit, via the at least one antenna, a first transmission using a first channel of a channel pair, the channel pair comprising the first channel and a second channel;
a receiver configured to receive, via the at least one antenna, a second transmission from an apparatus, wherein the second transmission is received on both the first and second channels of the channel pair, wherein one of the first and second channels is designated as a primary channel for the apparatus, and wherein the receiver is configured to receive the second transmission regardless whether the first channel or the second channel is designated as the primary channel; and
a processing system configured to:
determine that the first channel is designated as a secondary channel for the apparatus; and
after the determination, designate the second channel as the primary channel for the access point, wherein the access point and the apparatus belong to different basic service sets (BSS).

* * * * *